(12) United States Patent
Roberge

(10) Patent No.: US 8,082,727 B2
(45) Date of Patent: Dec. 27, 2011

(54) REAR PROPULSOR FOR A VARIABLE CYCLE GAS TURBINE ENGINE

(75) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1216 days.

(21) Appl. No.: 12/072,473

(22) Filed: Feb. 26, 2008

(65) Prior Publication Data

US 2009/0211222 A1    Aug. 27, 2009

(51) Int. Cl.
*F02K 3/02*    (2006.01)
(52) U.S. Cl. ........... 60/226.1; 60/226.3; 60/262; 60/263
(58) Field of Classification Search ................. 60/226.1, 60/226.3, 262, 263
See application file for complete search history.

(56) References Cited

U.S. PATENT DOCUMENTS

| | | | |
|---|---|---|---|
| 3,811,791 A | 5/1974 | Cotton | |
| 4,043,121 A | 8/1977 | Thomas et al. | |
| 4,376,375 A * | 3/1983 | Boudigues | 60/226.3 |
| 4,826,403 A | 5/1989 | Catlow | |
| 4,927,329 A | 5/1990 | Kliman et al. | |
| 4,934,825 A | 6/1990 | Martin | |
| 5,079,916 A | 1/1992 | Johnson | |
| 5,311,736 A | 5/1994 | Lardellier | |
| 5,402,638 A | 4/1995 | Johnson | |
| 5,794,432 A | 8/1998 | Dunbar et al. | |
| 5,806,303 A | 9/1998 | Johnson | |
| 5,809,772 A | 9/1998 | Giffin, III et al. | |
| 6,901,739 B2 | 6/2005 | Christopherson | |
| 6,966,174 B2 | 11/2005 | Paul | |
| 7,216,475 B2 | 5/2007 | Johnson | |
| 7,246,484 B2 | 7/2007 | Giffin, III et al. | |
| 2007/0022738 A1 | 2/2007 | Norris et al. | |

FOREIGN PATENT DOCUMENTS

| | | |
|---|---|---|
| EP | 0076192 | 4/1983 |
| GB | 2129502 | 5/1984 |
| GB | 2174761 | 11/1986 |
| WO | 2006059980 | 6/2006 |
| WO | 2006060003 | 6/2006 |

* cited by examiner

*Primary Examiner* — Michael Cuff
*Assistant Examiner* — Craig Kim
(74) *Attorney, Agent, or Firm* — Kinney & Lange, P.A.

(57) ABSTRACT

A gas turbine propulsion system comprises a turbofan engine, a peripheral duct, an annular frame, an auxiliary turbine and an auxiliary fan. The turbofan engine is configured to produce bypass air and combustion air. The bypass air flows through a bypass duct and the combustion air flows through a core engine. The peripheral duct surrounds the turbofan engine and is configured to selectively receive peripheral inlet air. The annular frame is disposed aft of the bypass duct and the peripheral duct, and is rotatable to alternately guide the bypass air out the bypass duct or the peripheral duct. The auxiliary turbine is connected to an aft end of the core engine and is configured to receive the combustion air. The auxiliary fan is connected to the auxiliary turbine and is configured to receive airflow from the peripheral duct.

16 Claims, 4 Drawing Sheets

REAR PROPULSOR FOR A VARIABLE CYCLE GAS TURBINE ENGINE

CROSS-REFERENCE TO RELATED APPLICATION(S)

Reference is made to a patent application entitled "AUXILIARY PROPULSOR FOR A VARIABLE CYCLE GAS TURBINE ENGINE" by Gary D. Roberge, Ser. No. 12/072,353 filed on the same day herewith and assigned to the same assignee as the present application.

BACKGROUND

This invention relates to gas turbine engines and, more particularly, to variable cycle engines that balance supersonic and subsonic performance.

A conventional multi-spool gas turbine engine has three basic parts in an axial, serial flow relationship: a core compressor to pressurize air entering into an inlet portion of the engine, a core combustor to add fuel and ignite the pressurized air into a propulsive gas flow, and a core turbine that is rotated by the propulsive gas flow, which in turn rotates the core compressor through a core shaft extending between the core turbine and the core compressor. The core compressor, the core turbine, the core combustor and the shaft are collectively referred to as the core engine.

Gas turbine engines intended for use in aircraft typically collect inlet air through an inlet cowling positioned at an upstream or front end of the engine. Typically, the propulsive gas flow is exhausted at a downstream or rear end of the engine through an exhaust nozzle, after flowing axially through the engine. The exhaust gas exits the nozzle at a higher velocity than the velocity of the inlet air thereby producing thrust with the net acceleration of the flow. A gas turbine engine that utilizes the core engine to accelerate all of the entering flow to produce thrust is typically referred to as a turbojet engine. The force, or thrust, generated by a turbojet is increased by either increasing the exhaust gas velocity or increasing the mass of air flowing through the engine. Gas turbine propulsive efficiency is directly related to the velocity of the exhaust leaving the engine in comparison with vehicle flight speed. Thus, turbojet engines with typically high exhaust velocities are well suited to producing high efficiency at supersonic speeds, and are somewhat inefficient at low speeds.

The thermodynamic efficiency of a turbojet engine can be altered by adding one or more lower pressure compressors upstream of the higher pressure core compressor; one or more lower pressure turbines downstream of the higher pressure core turbine; and low pressure shafts connecting the low pressure turbines and compressors. Such multi-spool engines increase the thermodynamic efficiency of turbojet engines, as the high pressure and lower pressure spools operate at their own optimum speeds and combine to deliver higher overall pressure ratio. Typically, multi-spool engines have either two spools (a low pressure spool and a high pressure spool) or three spools (a low pressure spool, an intermediate pressure spool, and a high pressure spool), but other configuration are possible. This patent application will use a dual-spool gas turbine engine as one example of a multi-spool gas turbine engine. A person of ordinary skill in the art will recognize that the concepts that are discussed in the concept of a dual-spool gas turbine engine are equally applicable to a three-spool gas turbine engine or other multi-spool gas turbine engines.

A turbofan engine, another type of dual-spool gas turbine engine, couples a large diameter fan to the upstream end of the low pressure compressor. Some of the inlet air entering the engine bypasses the core engine and is simply accelerated by the fan to produce a portion of the engine's thrust, while the rest of the air is directed to the core engine to sustain the combustion process and produce an added component of thrust. The ratio of the amount of air going around the core engine to the amount of air passing through the core engine is known as the bypass ratio (BPR). The fan can be used to produce a substantial portion of the total thrust generated by the engine because thrust production is partially dependent on fan airflow and the fan pressure ratio (FPR), the ratio of fan discharge pressure to fan inlet pressure, rather than aircraft speed. The net exhaust velocity is affected by the mixed velocity of the relatively slow fan stream and the core stream and is therefore affected by bypass ratio. Thus, turbofans typically have large BPRs with low to moderate FPR and are well suited to producing high thrust at subsonic speeds, and are somewhat inefficient at high speeds.

Fundamentally, in comparing the two engine types at equivalent thrust levels, turbojet engines accelerate smaller quantities of air to extremely high exhaust velocities to produce thrust, while turbofan engines accelerate larger quantities of air to much lower velocities. Thus, aircraft gas turbine engines have historically been able to perform well—in terms of propulsive efficiency—at either subsonic speeds or supersonic speeds, but not both. At subsonic speeds, it is desirable to have a high BPR and low FPR. At supersonic speeds, it is desirable to have a low BPR and high FPR. Attempts have been made to incorporate the advantages of turbojet and turbofan engines into a single combined cycle engine to achieve efficiency over a broad range of speeds. As such, there is a need for a variable cycle gas turbine engine that operates efficiently over a wide range of operating conditions.

SUMMARY

The present invention is directed to a variable cycle gas turbine propulsion system. The gas turbine propulsion system comprises a turbofan engine, a peripheral duct, an annular frame, an auxiliary turbine and an auxiliary fan. The turbofan engine is configured to produce bypass air and combustion air. The bypass air flows through a bypass duct and the combustion air flows through a core engine. The peripheral duct surrounds the turbofan engine and is configured to selectively receive peripheral inlet air. The annular frame is disposed aft of the bypass duct and the peripheral duct, and is rotatable to alternately guide the bypass air out the bypass duct or the peripheral duct. The auxiliary turbine is connected to an aft end of the core engine and is configured to receive the combustion air. The auxiliary fan is connected to the auxiliary turbine and is configured to receive airflow from the peripheral duct.

DETAILED DESCRIPTION

Figure 1:
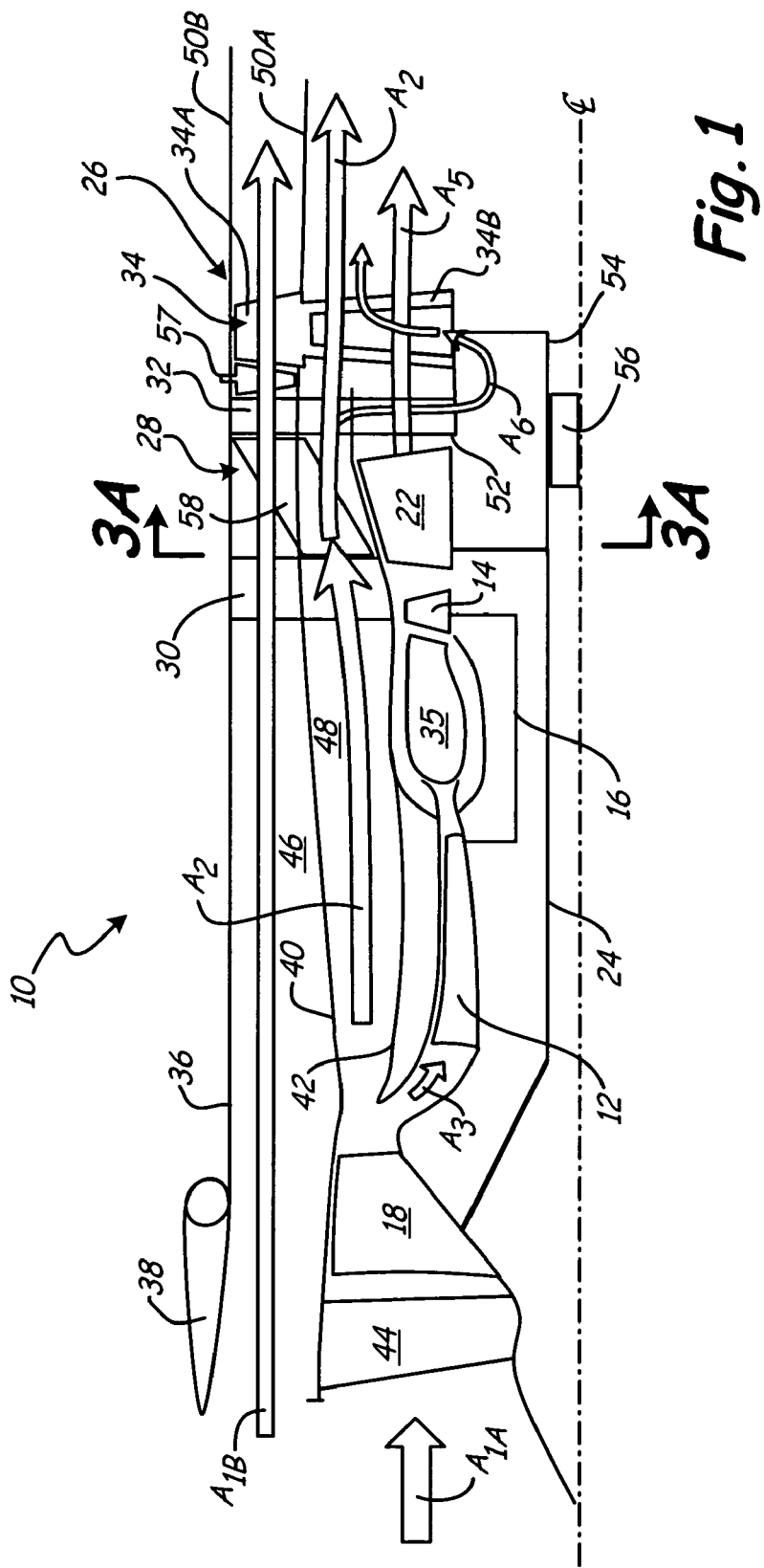
FIG. 1 shows a schematic cross-sectional view of a gas turbine engine incorporating a rear propulsor of the present invention in a low-speed mode.
Figure 2:
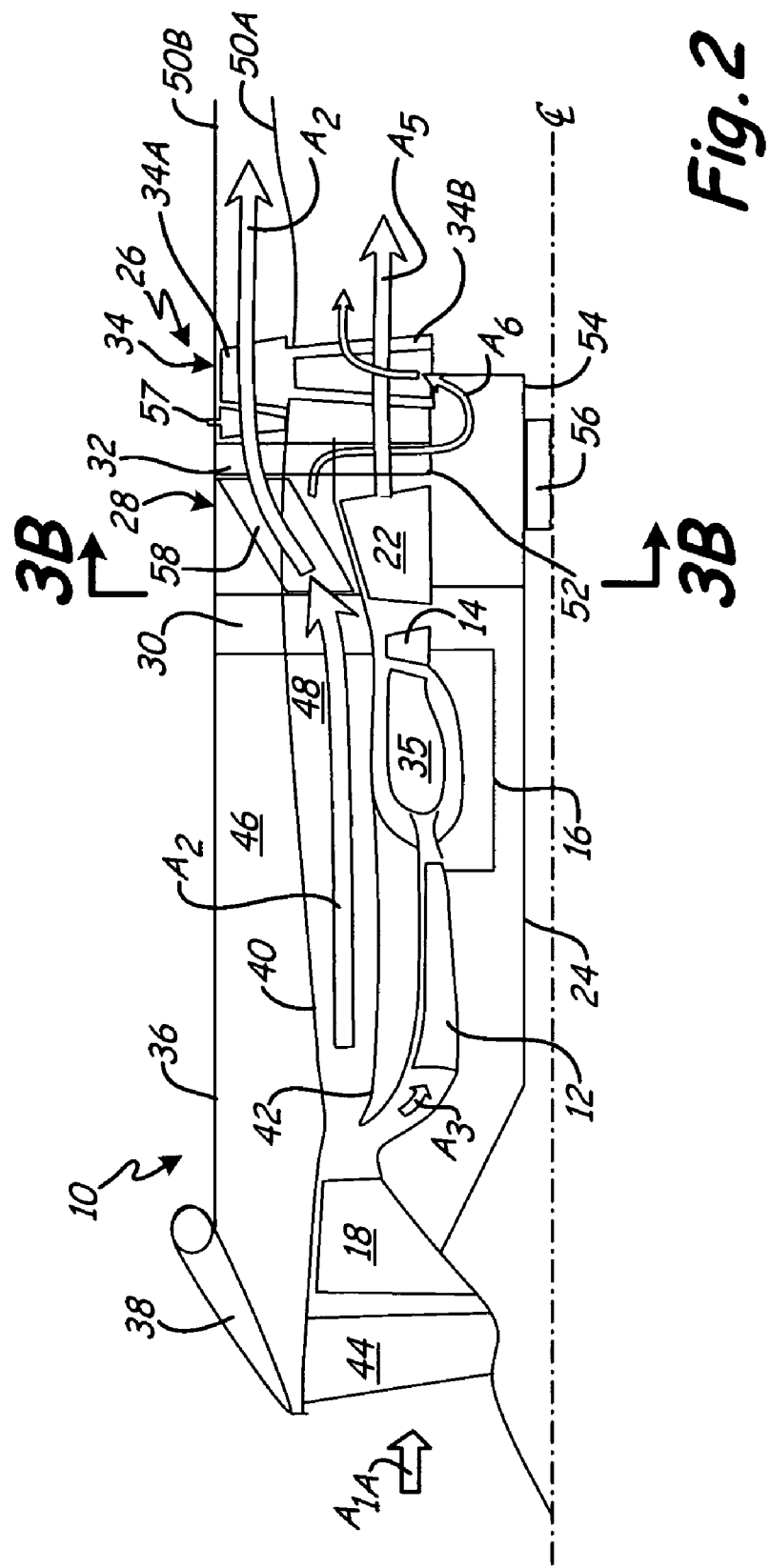
FIG. 2 shows a schematic cross-sectional view of a gas turbine engine incorporating a rear propulsor of the present invention in a high-speed mode.

FIGS. 1 and 2 show schematic views of variable cycle gas turbine engine 10 of the present invention operating in a low-speed mode and a high-speed mode, respectively. Gas turbine engine 10 includes a high pressure spool, which comprises high pressure compressor (HPC) 12, high pressure turbine (HPT) 14 and high pressure shaft 16; a low pressure spool, which comprises fan 18, low pressure turbine (LPT) 22 and low pressure shaft 24; and rear propulsor 26, which comprises rotatable frame 28, forward struts 30, aft struts 32 and propulsor blades 34. As such, engine 10 is configured in a fan-high configuration, but in other embodiments fan-low-high configurations may be used. Engine 10 also includes combustor 35, peripheral duct 36, flow diverter 38, bypass duct 40 and engine case 42. The various components of engine 10 shown in FIGS. 1 and 2 are not to-scale and are shown larger or smaller to better illustrate the present invention. The components of engine 10 are generally symmetric about engine centerline CL. The high pressure spool, the low pressure spool and blades 34 are configured to rotate about engine centerline CL within peripheral duct 36, bypass duct 40 and engine case 42, which remain stationary with respect to centerline CL. Although this patent application uses a dual-spool architecture as an exemplary embodiment, one of ordinary skill in the art will recognize that other embodiments using other engine architectures, such as a three-spool architecture are within the scope of this patent application.

The high pressure spool and combustor 35 comprise a core, gas generating engine that produces high pressure ratio and high temperature air flow after exiting HPT 14. The low pressure spool generates bypass air that produces low pressure ratio thrust with fan 18. Rear propulsor 26 utilizes the byproducts of the high and low pressure spools to provide additional propulsive thrust to engine 10 in low-speed and high-speed operating modes. In the low-speed mode, which is described below with reference to FIG. 1, flow diverter 38 is positioned such that inner and outer streams of inlet air $A_{1A}$ and $A_{1B}$ are permitted to flow into fan 18 and peripheral duct 36, respectively. Frame 28 is positioned to permit axial flow of the bypass portion of inlet air $A_{1A}$ (bypass air $A_2$) and inlet air $A_{1B}$ through engine case 40 and peripheral duct 36, respectively, to allow the flow of $A_{1B}$ to interact with blades 34 of a separate fan in rear propulsor 26. As such, engine 10 operates with characteristics improved over typical high bypass ratio turbofan engines. In the high-speed mode, which is described below with reference to FIG. 2, flow diverter 38 is positioned to prevent outer stream of inlet air $A_{1B}$ from entering peripheral duct 36, and frame 28 is positioned to permit a portion of inlet air $A_{1A}$ (bypass air $A_2$) to enter peripheral duct 36 to interact with blades 34 to further increase the fan pressure ratio. As such, engine 10 operates with characteristics improved over typical low bypass ratio turbofan engines.

Bypass duct 40 encircles the low pressure spool and the high pressure spool and includes inlet guide vanes (IGVs) 44. Peripheral duct 36 is positioned around bypass duct 40 to form peripheral passageway 46 between duct 36 and duct 40. Bypass duct 40 is positioned outside outside engine case 42 to form bypass passageway 48 between duct 40 and case 42. Flow diverter 38 is adjustably operable to control flow of inlet air $A_{1B}$ into peripheral passage 46, while inlet air $A_{1A}$ is free to enter fan 18 through IGVs 44. Fan 18 compresses and accelerates inlet air $A_{1A}$ with the discharged flow split into bypass component $A_2$ and core air component $A_3$. The proportion of flow between bypass air $A_2$ and core air $A_3$ is partially set by the geometry of engine case 42, and bypass air $A_3$ is captured by bypass duct 40. Engine case 42 also forms the outer structure for sealing the high pressure spool and LPT 22. After initially being compressed in fan 18, core air $A_3$ is directed to HPC 12 whereby it is further compressed to produce supercharged air that is directed to combustor 35. Supercharged core air $A_3$ is mixed with fuel and burned within combustor 35 to produce high energy gases $A_5$ for rotating HPT 14 and LPT 22. HPT 14 and LPT 22 are drivingly connected to HPC 12 and fan 18 through shafts 16 and 24, respectively, such that the combustion process can be sustained with pressurized air generated by fan 18 and HPC 12.

Engine case 42 extends from aft of fan 18 to aft of LPT 22 such that core air $A_3$ is able to flow axially through HPC 12, combustor 35, HPT 14 and LPT 22, whereupon gas $A_5$ engages blades 34 of rear propulsor 26. Bypass duct 40 extends from IGVs 44 to forward struts 30 such that bypass air $A_2$ flows axially through bypass passage 48, whereupon bypass air $A_2$ enters rotatable frame 28 before engaging blades 34 of rear propulsor 26. A small amount of bleed air $A_6$ is siphoned from bypass air $A_2$ as bypass air $A_2$ passes through rear struts 32 of rear propulsor 26 to provide cooling to blades 34 and to reduce adverse thermal gradients, as blades 34 are in the path of hot gas $A_5$. Peripheral duct 36, which in the embodiment shown is integrated with the structure of engine 10, extends from forward of fan 18 to forward struts 30 such that, depending on the position of flow diverter 38, the second stream of inlet air $A_{1B}$ is able to flow axially through peripheral passageway 46, whereupon inlet air $A_{1B}$ enters rotatable frame 28 before engaging blades 34 of rear propulsor 26. In other embodiments, peripheral duct 36 can be integrated into an airframe structure of an aircraft into which engine 10 is installed. After passage through blades 34 of rear propulsor 26, gas $A_5$ passes through exhaust duct 50A, while inlet air $A_{1B}$ passes through exhaust duct 50B. Exhaust ducts 50A and 50B collect and duct the exhausted gas to produce a component of overall engine thrust. Discharged inlet air $A_{1B}$ can also be collected and circulated to other parts of engine 10 for cooling purposes. Depending on the position of frame 28 and the operating mode of engine 10, bypass air $A_2$ passes out of frame 28 in either exhaust duct 50A or exhaust duct 50B after interacting with blades 34.

Blades 34 comprise outer portions 34A and inner portions 34B, which are integrally formed such that a single airfoil structure is shaped. Inner portions 34B comprise airfoils shaped for minimizing aerodynamic loss of flow exiting from LPT 22. Outer portions 34A comprise airfoils shaped for imparting acceleration to airflow emitting from peripheral passageway 46. Any suitable dual-structure airfoil blade as is known in the art may be used with the present invention, such as the FLADE airfoil blades described in the aforementioned Johnson '475 patent. Blades 34 are comprised of high strength, lightweight materials that have high temperature limitations, such as titanium or nickel-based alloys, or composite materials. In other embodiments, blades 34 are comprised of metal alloy cores having outer ceramic matrix composite sleeves. Inner portions 34B are arranged about a rotor disk and/or a support rotor, and are connected to propulsor shaft 54. Outer portions 34A are arranged about an annular shroud disposed at the tips of the inner portions 34B. Shaft 54 is connected to low pressure spool shaft 24 through gearbox 56. In other embodiments, shaft 54 is directly connected to shaft 24. In the general approach, gearbox 56 provides a gear reduction between shaft 24 and shaft 54 such that LPT 22 can rotate at optimal high speed dictated by gas $A_5$, and blades 34 can rotate at optimal low speeds dictated by bypass air $A_2$ and core air $A_5$. For example, the rotational speed of blades 34 needs to be reduced to speeds below that of HPT 14 and LPT 22 due to structural vulnerabilities that arise in blades with large diameters Inlet guide vanes 57 are positioned between peripheral duct 36 and bypass duct 40 to control air flow through propulsor 26. Vanes 57 include outer trunnion posts that permit vanes 57 to rotate about their radial axis to regulate flow of inlet air $A_{1B}$ across outer portions 34A. Vanes 57 may be connected to with other components, including an engine controller, to coordinate operation of blades 34 over the range of aerodynamic inlet conditions exhibited by pressure, velocity and flow of bypass air $A_2$ and inlet air $A_{1B}$ over the range of operating conditions presented by high-speed and low-speed operation of engine 10. In other embodiments, stator vanes can extend radially outward from platform 52 or radially inward from engine case 42 to control flow of core air $A_5$ to inner portions 34B. In other embodiments of the invention, auxiliary fuel injection can be included within auxiliary propulsor 26 to carry out afterburning, such as such as with a rotating swirl augmenter, to further increase the energy available in gas $A_5$ to turn inner portions 34B of blades 34.

Rotatable frame 28, which is described in greater detail with respect to FIGS. 3A through 4B, comprises an annular inverter valve structure that is configured to rotate about engine centerline CL between forward struts 30 and aft struts 32. Peripheral case 36, bypass duct 40 and engine case 42 are connected to each other and maintained concentric about centerline CL by forward struts 30 and rear struts 32. Forward struts 30 comprise a plurality of aerodynamically shaped pylons or beams that are intermittently arranged between peripheral duct 36 and engine case 42 such that struts 30 extend across peripheral passage 46 and bypass passage 48. Similarly, rear struts 32 comprise a plurality of aerodynamically shaped pylons or beams that are intermittently arranged between peripheral duct 36 and inner platform 52 such that struts 30 extend across peripheral passage 46, bypass passage 48 and LPT 22. Forward struts 30 assist in maintaining peripheral case 36 disposed about bypass duct 40, and bypass duct 40 disposed about engine case 42. Rear struts 32 comprise load bearing members that support bearings for structurally supporting the low pressure spool and the high pressure spool. Rear struts 32 are integrated into the turbine exhaust case of engine 10, such as at exhaust ducts 50A and 50B. Forward struts 30 and aft struts 32 are radially disposed such that they comprise a "wagon wheel" type pattern about engine centerline CL. Rear struts 32 are disposed downstream of forward struts 30 such that they are axially aligned with respect to centerline CL. Rear struts 32 are displaced axially downstream of forward struts 30 such that rotatable frame 28 fits between struts 30 and 32.

Frame 28 is comprised of a plurality of intermittent duct segments 58 that are shaped to direct airflow between bypass passage 48 and peripheral passage 46. In the low-speed mode, intermittent duct segments 58 are disposed axially downstream from forward struts 30 such that airflow is prevented from entering intermittent duct segments 58. As such, bypass air $A_2$ continues through from bypass passageway 48 to inner portions 34B of blades 34 such that performance of engine 10 is suitable for cruising operations. In the high-speed mode, rotatable frame 28 is rotated such that forward struts 32 no longer restrict airflow into intermittent duct segments 58 and, in addition to flow diverter 38, closes of flow of air through peripheral passageway 46. As such, bypass air $A_2$ is directed to peripheral passageway 46 to outer portions 34A of blades 34 to change the performance characteristics of engine 10 to those more suitable for high performance operations.

With reference to FIG. 1 and low-speed operation of engine 10, engine case 42 directs a small volume of inlet air $A_{1A}$ into the core engine as core air $A_3$ to produce a high pressure ratio across HPT 14 and LPT 22. The combustion process executed in combustor 35 imparts a large increase in momentum to a small volume of inlet air to produce thrust with gas $A_5$. Engine case 42 directs a larger volume of inlet air $A_{1A}$ into bypass passage 48 whereupon a moderate pressure ratio is produced across fan 18. Fan 18, which is driven by LPT 22 through low pressure shaft 24, performs work on inlet air $A_{1A}$ to impart a small increase in momentum to a large volume of inlet air to produce thrust with bypass air $A_2$. As such, engine 10 efficiently produces a large amount of thrust suitable for propelling an aircraft at cruising speeds. In the low-speed mode, the present invention utilizes peripheral duct 36 and blades 34 to increase the effective bypass ratio of engine 10 to enhance low-speed, subsonic operation of engine 10. Specifically, LPT 22, directly or through gearbox 56, drives blades 34 such that inlet air $A_{1B}$ is accelerated to produce thrust. Outer portions 34A act as a peripheral fan and fan 18 acts as an inner diameter fan such that fan 18 and outer portions 34A operate as parallel flow fans. Outer portions 34A perform work on inlet air $A_{1B}$ to produce a low pressure ratio across blades 34. Fan 18 performs work on bypass air $A_2$ to produce a moderate pressure ratio across fan 18. Inlet air $A_{1B}$ and bypass air $A_2$ produce a combined bypass stream around the core engine with a hybrid pressure ratio, which increases the bypass ratio of engine 10. As such, propulsive efficiency of engine 10 is increased at low-speed operation.

With reference to FIG. 2 and high-speed operation of engine 10, the low pressure spool and the high pressure spool operate similar to that of the low-speed mode. Specifically, the combustion process in combustor 35 imparts a large increase in momentum to a small volume of inlet air $A_{1A}$, core air $A_3$, to produce a high pressure ratio across HPT 14 and LPT 22, and fan 18 imparts a small increase in momentum to bypass air $A_2$. In the high-speed mode, however, flow diverter 38 is positioned to prevent inlet air $A_{1B}$ from entering peripheral duct 46, and frame 28 directs bypass air $A_2$ out of passageway 48 and into passageway 46. As such, engine 10 intakes a smaller volume of inlet air as compared to the low-speed mode, resulting in a smaller percentage of air bypassing combustor 35. Compared to the low-speed mode, engine 10 thus produces a higher overall fan pressure ratio with higher exhaust velocity, resulting in better performance at supersonic high-speed operation. Engine 10 has the added benefit that bypass air $A_2$ is routed from fan 18 to outer portions 34A of blades 34 by frame 28 such that fan 18 and outer portions 34A operate as serial flow fans. Outer portions 34A of blades 34 supercharge bypass air $A_2$. As such, propulsive efficiency of engine 10 is increased at high-speed operation.

The specific volumes of inlet air $A_{1A}$ and inlet air $A_{1B}$ directed into engine 10, and the volume of bypass air $A_2$ diverted to HPT 12 by engine case 42 are selected based on design parameters and varies in different embodiments of the invention. For example, the flow rates of each stream of air must be coordinated to sustain combustion within combustor 50 and to prevent surge or stall in HPT 14, LPT 22 and propulsor 26. Likewise, the volume of bleed air $A_6$ bled into rear struts 32 varies in different embodiments of the invention and depends on selected design parameters such as material selection, engine temperatures and mass flow rates.

Figure 3A:
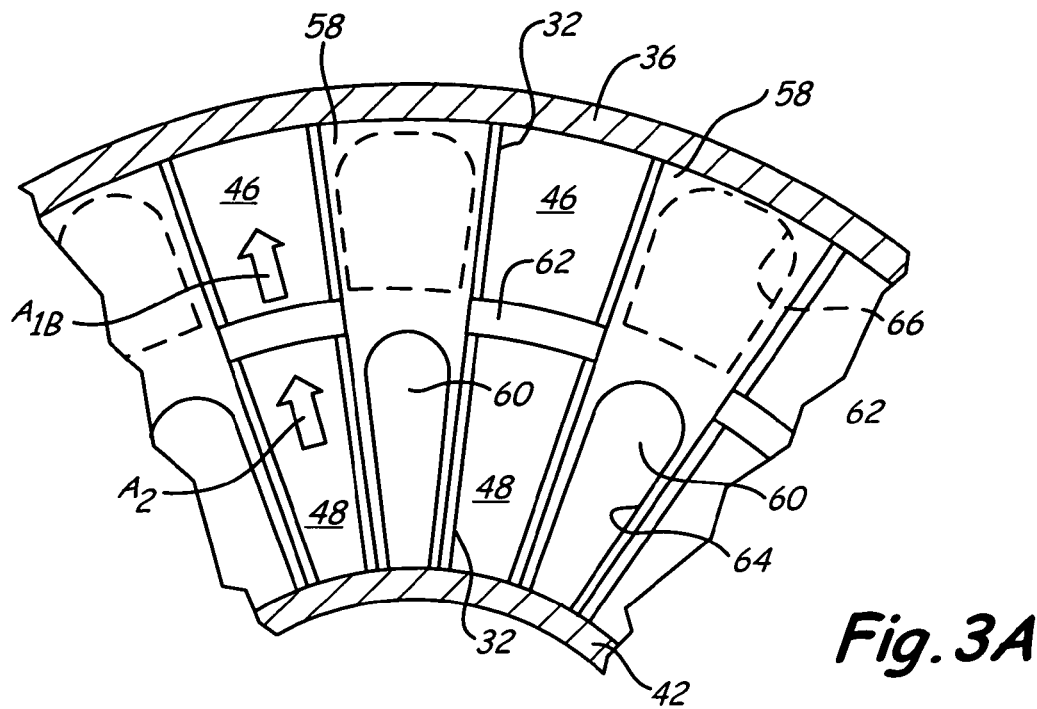
FIG. 3A shows a schematic front view of a rotatable frame of the rear propulsor from FIG. 1 showing air flow through a peripheral duct and a bypass duct.
Figure 3B:
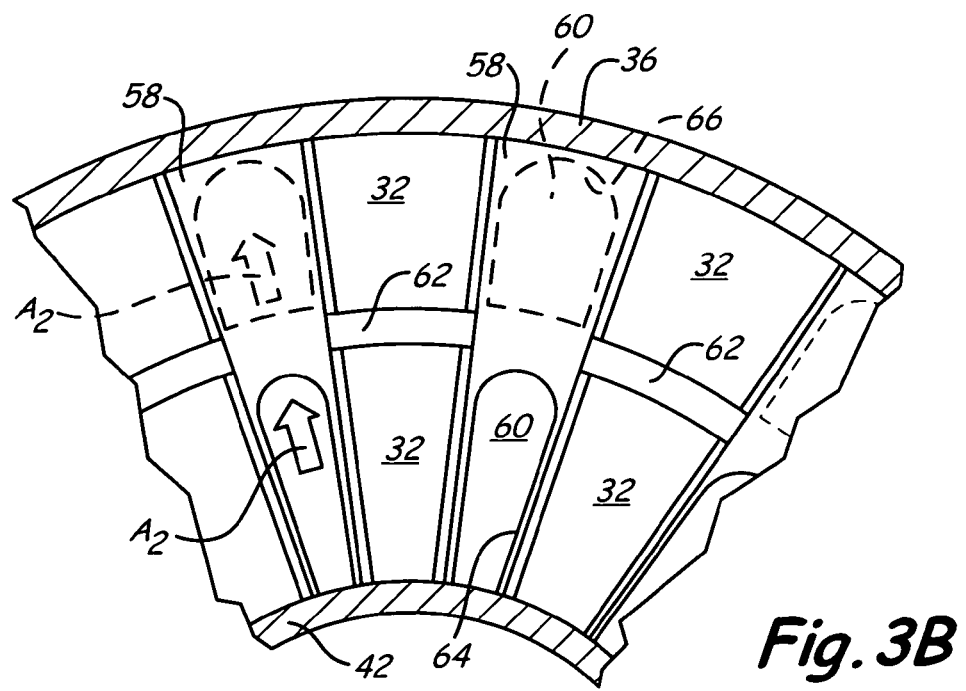
FIG. 3B shows a schematic front view of a rotatable frame of the rear propulsor from FIG. 2 showing air flow from a bypass duct to a peripheral duct.
Figure 4A:
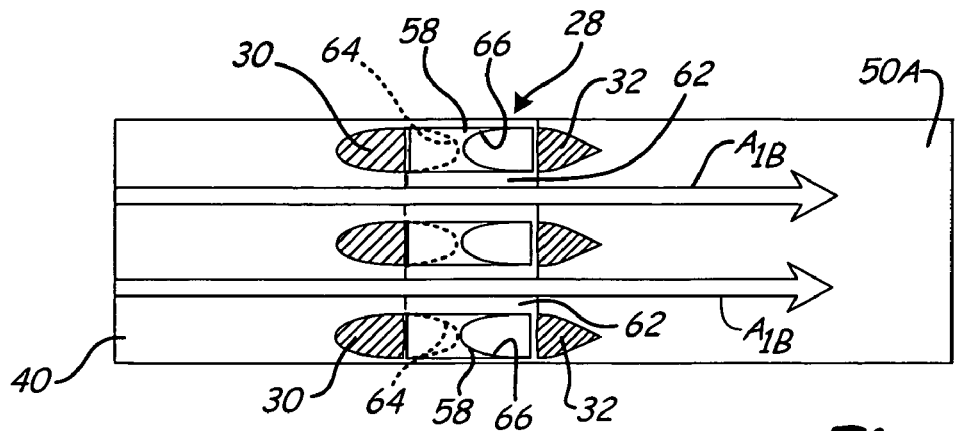
FIG. 4A shows a schematic top view of the rotatable frame of the rear propulsor from FIG. 1 showing air flow through a peripheral duct.
Figure 4B:
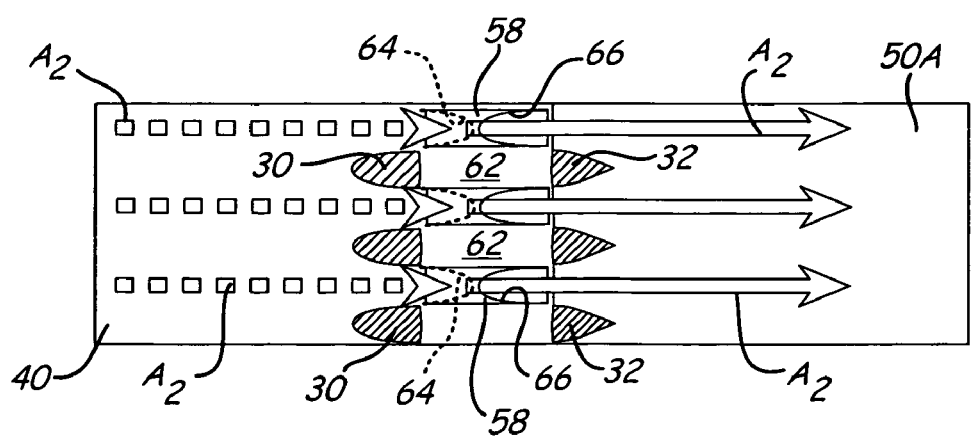
FIG. 4B shows a schematic top view of the rotatable frame of the rear propulsor of FIG. 2 showing air flow from a bypass duct to a peripheral duct.

FIGS. 3A-4B show different views of rotatable frame 28 and are discussed concurrently. FIG. 3A shows a schematic front view of rotatable frame 28 taken at section 3A-3A of FIG. 1. FIG. 3B shows a schematic front view of rotatable frame taken at section 3B-3B of FIG. 2. FIG. 3A shows flow of inlet air $A_{1B}$ through peripheral passageway 46, and flow of bypass air $A_2$ through bypass passageway 48. FIG. 3B shows flow of bypass air $A_2$ from inner passageway 48 into peripheral passageway 46. FIGS. 4A and 4B show schematic top views of rotatable frame 28 of FIGS. 1 and 2, respectively, indicating flow through peripheral passageway 46. FIG. 4A shows inlet air $A_{1B}$ flowing through peripheral passageway 46 above bypass duct 42. FIG. 4B shows bypass air $A_2$ flowing under engine case 40, through rotatable frame 28 and into peripheral passageway 46 above engine case 40.

Rotatable frame 28 operates as an inverter valve and includes intermittent duct segments 58, which include radial passageways 60, and fairings 62. Radial passageways 60 include inlets 64 and outlets 66. Forward struts 30 are disposed axially forward of intermittent duct segments 58 (as such, forward struts 30 are not seen in FIGS. 3A and 3B), while rear struts 32 are disposed axially aft of intermittent duct segments 58. Intermittent duct segments 58 are radially disposed between bypass duct 42 and peripheral duct 36. Fairings 62 connect adjacent intermittent duct segments 58 such that rotatable frame 28 comprises a generally annular structure. Engine case 40 is disposed forward of fairings 62 and exhaust duct 50A is disposed aft of fairings 62 (as such, engine case 40 and exhaust duct 50A are not seen in FIGS. 3A and 3B) such that peripheral passageway 46 is separated from bypass passageway 48. Radial passageway 60 extends through the interior of intermittent duct segments 58 to connect bypass passageway 48 with peripheral passageway 46. Inlets 64 are positioned on lower portions of the upstream side of intermittent duct segments 58 such that they are positioned within bypass passageway 48 and face forward struts 30. Outlets 66 are positioned on upper portions of the downstream side of intermittent duct segments 58 such that they are positioned within peripheral passageway 46 and face toward aft struts 32. Radial passageways 60 connect inlets 64 with outlets 66 such that airflow can pass through fairings 62. As such, rotatable frame 28 comprises an inverter valve that alternately directs flow of bypass air $A_2$ to peripheral passageway 46 and bypass passageway 48 in different operating modes of engine 10.

In the low-speed mode, shown in FIGS. 3A and 4A, intermittent duct segments 58 are positioned between forward struts 30 and aft struts 32 such that inlets 64 and outlets 66 are blocked and the inverter valve is closed. Specifically, inlets 64 are blocked by forward struts 30 to prevent flow of bypass air $A_2$ into radial passageways 62. As such, bypass passageway 48 and peripheral passageway 46 are unobstructed by intermittent duct segments 58. Bypass air $A_2$ therefore flows freely through bypass passageway 48 and inlet air $A_{1B}$ flows freely through peripheral passageway 46, with fairings 62 maintaining separation between the two flow paths. Thus, inlet air $A_{1B}$ is accelerated by outer portions 34A of blades 34, and inner portions 34B of blades 34 extract energy from bypass air $A_2$.

In the high-speed mode, shown in FIGS. 3B and 4B, rotatable frame 28 is rotated about engine centerline CL to adjust the tangential position of intermittent duct segments 58. Intermittent duct segments 58 are displaced tangentially such that they are removed from being axially disposed between forward struts 30 and aft struts 32. Thus, forward struts 30 do not block inlets 64 and aft struts 66 do not block outlets 66 and the inverter valve is opened. As indicated in FIG. 2, flow diverter 38 is rotated such that flow of inlet air $A_{1B}$ into peripheral duct 36 is prevented. Furthermore, intermittent duct segments 58 inhibit flow of air through peripheral passageway 46. Bypass air $A_2$, however, still enters bypass passageway 48 within engine case 40. Inlets 64 intercept the flow of bypass air $A_2$ through bypass passageway 48 inducing radially outward flow of bypass air $A_2$ through radial passageway 60, through outlet 66 and into peripheral passage 64. Forward struts 30 prevent bypass air $A_2$ from bypassing intermittent duct segments 58 and continuing to flow through bypass passageway 48 to blades 34. Thus, bypass air $A_2$ is accelerated by outer portions 34A of blades 34 to further produce thrust.

The present invention provides a variable cycle gas turbine propulsion system that addresses the need for a gas turbine engine that operates efficiently over a wide range of speeds and operational conditions. Gas turbine engine 10 comprises a dual spool turbofan includes variable ductwork and a rear propulsor that adjusts the volume of inlet air taken into the engine, and accelerates the flow of air leaving the engine, respectively. In a first, high-speed mode of operation, the variable ductwork permits additional inlet air that bypasses the core gas turbine engine, which is accelerated by the auxiliary propulsor 26 to produce thrust as it leaves engine 10. As such, engine 10 achieves benefits that are associated with high bypass ratio turbofan engines, such as improved subsonic operation fuel economy and reduced noise. In a second, high-speed mode of operation, the variable ductwork prevents additional inlet air from entering engine 10. The variable ductwork also includes an inverter valve that directs bypass air from within the turbofan engine to the rear propulsor where the bypass air is supercharged to increase the velocity of the bypass air. As such, engine 10 achieves benefits that are associated with low bypass ratio turbofan engines, such as rapid acceleration and improved response characteristics.

Although the present invention has been described with reference to preferred embodiments, workers skilled in the art will recognize that changes may be made in form and detail without departing from the spirit and scope of the invention.

The invention claimed is:

1. A variable cycle gas turbine engine comprising:
   a turbofan engine comprising:
      a low pressure spool for generating a stream of bypass air and a stream of pressurized air;
      a high pressure spool for further pressurizing the stream of pressurized air to generate a stream of combustion air;
      an engine case surrounding the low pressure spool and the high pressure spool; and
      a flow divider positioned within the engine case to form a bypass passage;
   a peripheral case surrounding the engine case to form a peripheral passage, the peripheral case configured to selectively receive a stream of peripheral inlet air;
   a rear propulsor connected to an aft end of the low pressure spool within the peripheral case, the auxiliary propulsor configured to receive airflow from the bypass passage and the peripheral passage; and
   a rotatable rear frame positioned between the low pressure spool and the rear propulsor, wherein the rear frame is configured to alternatively direct airflow through the engine in a first mode and a second mode;
   wherein the first mode comprises:
      directing bypass air from the bypass passage to the auxiliary propulsor; and
   wherein the second mode comprises:
      directing the bypass air from the bypass passage to the peripheral passage before the bypass air is passed to the auxiliary propulsor.

2. The variable cycle gas turbine engine of claim 1 and further comprising a gearbox connecting the low pressure spool with the rear propulsor.

3. The variable cycle gas turbine engine of claim 1 wherein the rotatable rear frame comprises:
   a plurality of tubular members configured for receiving inlet airflow from the bypass passage and discharging outlet airflow into the peripheral passage; and
   a plurality of divider panels for connecting the plurality of tubular members to form an annular ring and for separating airflow in the peripheral passage and the bypass passage between the tubular members.

4. The variable cycle gas turbine engine of claim 3 and further comprising:
   a plurality of forward struts extending from the flow divider, through the engine case and to the peripheral case; and
   a plurality of aft struts extending from the low pressure spool to the peripheral case, wherein the aft struts are disposed axially downstream from the forward struts.

5. The variable cycle gas turbine engine of claim 4 wherein the rotatable rear frame is positioned axially between the forward struts and the aft struts in the first mode, and wherein the rotatable rear frame is tangentially offset of the forward struts and the aft struts in the second mode.

6. The variable cycle gas turbine engine of claim 4 wherein the plurality of aft struts are positioned axially downstream of the low pressure compressor and comprise hollow members configured to receive bleed air from the bypass passage.

7. The variable cycle gas turbine engine of claim 6 wherein the rear propulsor comprises a plurality of airfoil blades each having an inner turbine portion positioned axially downstream of the low pressure spool and the bypass passage, and an outer fan portion positioned axially downstream of the peripheral passage.

8. The variable cycle gas turbine engine of claim 7 wherein inner turbine portions of the plurality of airfoil blades include internal passages for receiving cooling air from the plurality of aft struts.

9. The variable cycle gas turbine engine of claim 7 and further comprising a variable guide vane positioned between the peripheral case and the engine case to regulate airflow to the outer fan portions of the plurality of airfoil blades.

10. The variable cycle gas turbine engine of claim 1 wherein the peripheral case includes a variable position flow diverter to control airflow into the peripheral passage.

11. A gas turbine propulsion system comprising:
    a turbofan engine configured to produce bypass air and combustion air, and wherein the bypass air flows through a bypass duct and the combustion air flows through a core engine;
    a peripheral duct surrounding the turbofan engine and configured to selectively receive peripheral inlet air;
    an annular frame disposed aft of the bypass duct and the peripheral duct, the annular frame being rotatable to alternately guide the bypass air out the bypass duct or the peripheral duct;
    an auxiliary turbine connected to an aft end of the core engine and configured to receive the combustion air; and
    an auxiliary fan connected to the auxiliary turbine and configured to receive airflow from the peripheral duct.

12. The gas turbine propulsion system of claim 11 and further comprising a gearbox positioned between the auxiliary turbine and the core engine.

13. The gas turbine propulsion system of claim 11 wherein the annular frame comprises:
    a plurality of tubular members having radially extending interior flowpaths for directing bypass air from the bypass duct to the peripheral duct;
    a plurality of fairings for connecting the plurality of tubular members to form an annular ring and for preventing bypass air from entering the peripheral duct between the tubular members;
    a plurality of forward struts disposed axially upstream of the tubular members; and
    a plurality of aft struts disposed axially downstream of the tubular members.

14. The gas turbine propulsion system of claim 11 and further comprising a cooling system comprising a bleed line for bleeding cooling air from the bypass duct and passing the cooling air through the rear struts and the auxiliary turbine.

15. The gas turbine propulsion system of claim 11 and further comprising:
    a variable position flow diverter connected to the peripheral duct to control airflow into the peripheral duct; and
    a variable guide vane positioned within the peripheral duct to regulate airflow to the auxiliary fan.

16. The gas turbine propulsion system of claim 11 wherein the auxiliary turbine comprises a plurality of turbine blades disposed axially downstream of the bypass duct and the core engine, and the auxiliary fan comprises a plurality of fan blades extending radially from the plurality of turbine blades to be disposed axially downstream of the peripheral duct.

* * * * *